Patented Aug. 3, 1926.

1,595,049

UNITED STATES PATENT OFFICE.

ROBLEY H. MORRISON, OF AKRON, OHIO.

PROCESS OF MANUFACTURING A RUBBERIZED FIBER COMPOSITION.

No Drawing.  Application filed July 31, 1922. Serial No. 578,826.

My invention relates to a process for the manufacture of a material capable of many useful applications, such as for floor and wall coverings, as a substitute for leather, or for other purposes to which a tough, flexible, porous, water-resistant body may be adapted. More specifically, it consists in treating fibers in such a way as to saturate and thoroughly impregnate them with a binding material, thereby rendering it possible to compact and mold the product to any degree and in any way desired. As such a binding material I may use rubber, rubber compounds or other substances of a like nature which may be vulcanized when heated with sulphur or other curing agents.

The fibers, which are capable of being treated according to the details of my process as hereinafter disclosed, are not limited to any one kind or type. Thus, for example, I may use cotton, linen, hemp, manilla, jute, asbestos, wool, leather, or wood fibers as prepared for paper making, or any felting material, such as hair or fur or other materials of a like nature. With a fiber or mixture of fibers, I combine a substance, such as rubber, oil, or gum which may be readily dissolved and precipitated from solution on to the fibers and which, furthermore, is susceptible to vulcanization with sulphur by heat or by any other well known method. In this way, I obtain a product, all the fibers of which are apparently coated with the impregnating material and which is tough, flexible, porous to gases, waterproof and capable of being compressed and molded into any desired form and then vulcanized.

My preferred process for the manufacture of this composition is as follows: The fibers, preferably wood pulp fibers and particularly that brand known as sulphate "kraft," or that produced from wood by the well known sulphite or soda process, are beaten with a liquid in an ordinary beating engine of well known form, or in any other similar machine used for a like purpose in the paper industry. The consequent disintegration should leave the material in a fibrous condition and particular care should be taken not to comminute or break down the fibers any more than is unavoidable in the process. As the liquid to be used in the beater with the pulp, I use one that serves as a precipitating agent of the gum used. When rubber is used as the gum and is precipitated from a benzol or a gasoline solution, I prefer to use wood or denatured alcohol as the beating agent for the fibers. In the place of alcohol, I may use any liquid which is miscible with that added as a solvent or carrier of the gum or rubber. In order to obtain the best results, the pulp should be dried before being placed in the beater. This is advisable in order to prevent unnecessary dilution of the alcohol, or other liquid, which should always be avoided if a solvent miscible with water is used. The drying of the fibers would, of course, be unnecessary in case water be used as a beating agent.

The best conditions for the operation of my process are most quickly attained if not too large a proportion of fibers to liquid be taken. I have found that the most satisfactory results are obtained when the amount of fibers used is less than 8% of the weight of liquid taken. In any case, it must not be so large an amount that a thick mass of wetted fibers is produced but must be a fluid mixture in which the individual fibers may be separated from one another as completely as possible. The mixture is then beaten up until the mass of fiber is thoroughly disintegrated, after which it is run into a tank in which there are power driven agitators. There is now added to the mixture in a tank a sufficient quantity of rubber cement or other substance of the required properties to produce a material containing any desired proportion of rubber to the dry fiber, which proportion I have found should be varied according to the use to which I may put the finished product. Thus, for a substitute for leather in the making of soles and heels I have found that a mixture of about 33% dry rubber and 67% dry pulp gives the best results, although other proportions will yield a material of high quality.

The rubberized fibers are agitated for a period of time sufficient to thoroughly intermix and incorporate the materials together. The time required to accomplish this will, of course, vary according to the composition of the cement and as a medium in beating up the pulp or other fibers should preferably be miscible with one another but one of them should be a non-solvent for rubber. By the use of such a combination of liquids, the rubber is precipitated on the fibers of the pulp or of any other fibrous material which it is desired to treat in this manner.

The rubberized fibers are then removed from the liquid mixture, by any desirable method, such as screening, and the liquids are allowed to drain away. The elimination of the liquids may be aided by means of suction, which may be applied to the fibers on the screen. It is possible to shape the mass of rubberized fibers in any desired form and then to heat cure them under any desired or necessary pressure and temperature to vulcanize the rubber present and to form a compact mass which may be used for any desired purpose as hereinbefore mentioned. I prefer to strain the fibers from the liquid slowly, so as to permit the fibers to assume a natural matted formation, as such formation is relatively stronger than a similar formation in which the natural matted formation has been disturbed.

The rubber cement which I prefer to use may be composed of any proportion of rubber and solvent that is desirable as well as practicable. The concentration of cement and the amount added will be decided by the qualities desired in the finished material. There is preferably some curing agent, such as sulphur, present in the cement, and there may or may not be added accelerators, filling agents, or compounding ingredients. Moreover, the time required to cure the finished material will vary according to the composition of the cement used.

It is to be understood that the proportion of rubber or gum that is mixed with the fibers in the making of my composition is an amount sufficient to bind together the fibers used and may or may not predominate in the mixture. It is an essential point in my invention that the rubber or gum is homogeneously distributed about the fibers as completely as possible and this result I accomplish by adding a solution or cement of rubber to the fibers suspended in some liquid in a comparatively loose state.

In practising my invention, although larger proportions may be employed, I prefer that the quantity of fibers mixed with the precipitant shall constitute from ½ to 2% thereof, and that the subsequently added rubber solution shall contain a quantity of rubber equal to ½ to 2% of the precipitant.

Although I have described in detail the specific steps of my process and have given particular solvents, chemicals or other reagents used in practicing the same, it will be understood that the claims hereto appended define the invention and I am not limited in any way except by them. Furthermore, my invention is not to be regarded as dependent on the soundness or accuracy of any theories herein propounded.

What I claim is:

1. The process of treating wood pulp fibers which consists in separating the fibers by agitation in a liquid which is a non-solvent of a vulcanizable gum, adding thereto a solution of a vulcanizable gum, removing the fibers from the liquid and vulcanizing the product.

2. The process of rubberizing wood pulp fibers which consists in separating the fibers by agitation in a liquid which is a precipitant of rubber, adding thereto a solution of rubber, removing the rubberized fibers from the liquid and vulcanizing the product.

3. The process of rubberizing wood pulp fibers which consists in separating the fibers by agitation in a liquid which is a non-solvent of a vulcanizable gum, adding thereto a colloidal solution of a vulcanizable gum, removing the rubberized fibers from the liquid and vulcanizing the product.

4. The process of making a substitute for leather or rubber, which consists in separating the fibers of wood pulp by agitation in alcohol, adding thereto a benzol rubber cement, removing the rubberized wood pulp fibers from the liquid and vulcanizing the product.

5. The method of making a fibrous material which comprises mixing a quantity of fibers in a precipitant of rubber, adding thereto a quantity of rubber in solution so as to effect precipitation of the rubber on the fibers, so straining the fibers from the liquid as to form a mat and vulcanizing said mat.

6. The method of making a fibrous material which comprises mixing with a rubber precipitant a quantity of fibers constituting approximately ½ to 2% of the precipitant, adding thereto a rubber solution to effect precipitation of the rubber on the fibers, the rubber constituting approximately ½ to 2% of the precipitant, so straining said treated fibers from the liquid as to effect a matted formation, and vulcanizing the mat.

In witness whereof, I have hereunto signed my name.

ROBLEY H. MORRISON.